May 8, 1962    A. O. McCOUBREY    3,034,078
TEMPERATURE COMPENSATED MICROWAVE CAVITY
Filed June 29, 1959

*INVENTOR.*
ARTHUR O. McCOUBREY
BY Kenway, Jenney
Witter & Hildreth

ATTORNEYS 3,034,078
TEMPERATURE COMPENSATED MICROWAVE CAVITY
Arthur O. McCoubrey, Topsfield, Mass., assignor to National Company, Inc., Malden, Mass., a corporation of Massachusetts
Filed June 29, 1959, Ser. No. 823,491
13 Claims. (Cl. 333—83)

My invention relates in general to new and improved microwave cavities and, in particular, to microwave cavities compensated for the effects of thermal expansion to prevent frequency detuning.

In microwave cavity resonators, the frequency of oscillation is critically dependent upon the physical dimensions of the cavity. Even small ambient temperature changes are frequently accompanied by changes of the frequency at which the cavity resonates. Inasmuch as the resonant cavities are often used as frequency reference elements or as filters in microwave circuits, it is desirable that the resonant frequency be independent of temperature as far as possible.

Prior temperature compensation techniques as applied to cavity resonators have frequently been dependent upon the use of materials having negligible thermal coefficients of expansion. Alternatively, apparatus has been employed which uses moving parts to maintain the critical cavity dimensions constant. Other compensation schemes have accepted the dimensional change of the cavity with a change of temperature and have compensated for it, by the insertion of a tuning element whose position relative to the cavity changes with a change of temperature. The above-mentioned compensation techniques have frequently involved complex apparatus critically dependent on the properties under ideal conditions of the materials employed and/or on their changes with temperature. In general, these prior devices have either failed to achieve accurate temperature compensation and were operative only over a narrowly defined temperature range, or have been extremely complex in construction.

Figure 1:
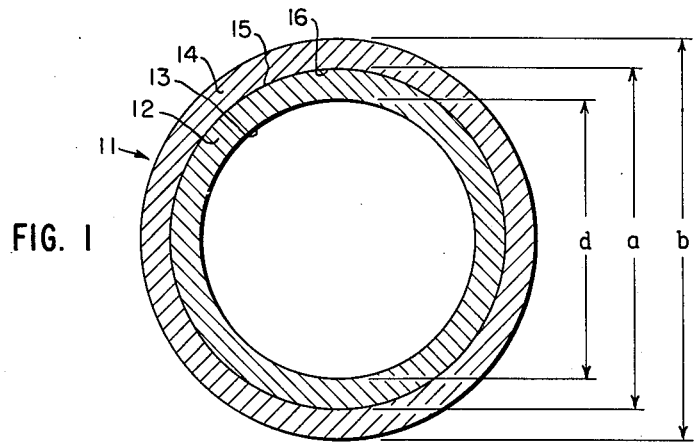
Figure 2:
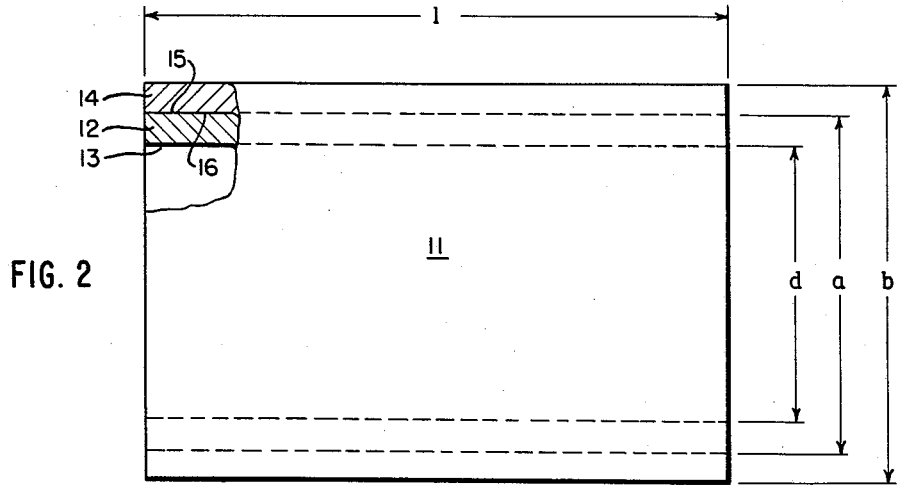

It is a principal object of the present invention to provide apparatus which overcomes the foregoing disadvantages and which employs a simple microwave cavity whose critical internal dimensions remain substantially constant over a wide ambient temperature range. This object of the invention is carried out without complex moving parts by relying on the mutual coaction of the elements with temperature changes. This and other objects of the invention, together with further features and advantages thereof will become apparent from the following detailed specification with reference to the accompanying drawings in which:

FIG. 1 represents a plan view of a preferred embodiment of the invention wherein such structure as is not essential to an understanding of the invention has been omitted; and FIG. 2 represents a side view of the apparatus of FIG. 1.

With reference to the drawings, the resonant cavity is seen to be defined by the interior dimensions of jacket 12 which is a hollow right cylinder whose interior surface 13 has a diameter "$d$." When operating in the $TM_{010}$ mode the length $l$ of the cavity is not important in determining the resonant frequency $f_0$ which is given by the following equation:

$$\frac{c}{f_0} = \lambda_0 = \frac{\pi d}{2.405}$$

where $f_0$ is the wavelength corresponding to the resonant frequency, "$c$" is the speed of light in a vacuum and "$d$" is the inside diameter of surface 13 defining the cavity.

A second cylindrical jacket 14 is disposed in coaxial surrounding relationship with respect to jacket 12, the interior surface 15 of cylinder 14 being contiguous throughout the exterior surface 16 of cylinder 12. In a preferred embodiment, the contiguous surfaces are joined together, e.g. by brazing or soldering.

The two cylinders consist of different materials, cylinder 12 having a larger thermal coefficient of expansion than cylinder 14. The required thermal coefficient of expansion of cylinder 14 may vary upward from and including zero depending on its modulus of elasticity, the effect of temperature changes on the latter and the thermal and elastic properties of cylinder 12. With a predetermined thermal coefficient for cylinder 14, the above parameters may be used to determine the choice of a material having a modulus of elasticity which provides the desired elastic deformation. By the proper choice of the material, i.e. choice of thermal coefficient of expansion and modulus of elasticity, the modulus of elasticity may be varied down to zero at which point any deformation of cylinder 14 is due to thermal expansion.

The compensating mechanism of the invention herein will be understood by considering the following illustration. Let cylinder 12 consist of copper and let cylinder 14 consist of a material such as Invar whose thermal coefficient of expansion is substantially zero. Upon an increase in temperature and given sufficient wall thickness to prevent any elastic deformation of cylinder 14, diameter "$a$" determined by surfaces 15 and 16 is prevented from increasing despite the pressure exerted by interior cylinder 12. Since the volume of the copper must increase as a result of the heating, it can do so only if diameter "$d$" decreases. The latter action is, of course, accompanied by an elastic deformation of cylinder 12.

The decrease in diameter "$d$" described above with an increase in temperature, runs counter to the usual situation for a free copper cylinder wherein "$d$" increases with rising temperature. By choosing the material and the thickness of cylinder 14 to allow only enough elastic deformation thereof to constrain the expansion of cylinder 12 with rising temperature to the proper amount, or by selecting a non-elastic structure for cylinder 14 having a coefficient of expansion which deforms a like amount with increasing temperature, or by a combination of both, it is possible to make diameter "$d$" independent of temperature within a predetermined temperature range. This result is brought about by applying sufficient constraint to the expansion of cylinder 12 so that any increase in the volume of its material is evidenced only by an increase of diameter "$a$" while diameter "$d$" remains constant. Although many combinations of the several parameters involved are possible, by the proper selection of the parameters the ambient temperature range in which "$d$" remains constant can be made relatively large. It is desirable to select materials for the two cylinders which have similar crystalline structures so that temperature compensation may occur over a fairly wide range.

It will be readily apparent that numerous modifications may be made without departing from the spirit and scope of the invention herein. As pointed out above, temperature compensation for a given material of cylinder 12 may be achieved by reliance on the thermal expansion only of cylinder 14, or by the proper choice of the thermal coefficient of expansion of the latter combined with the proper thickness and the proper modulus of elasticity, or by a combination of these parameters. Cylindrical jacket 14 need not be made of metal nor is its structure confined to a single integral cylinder. For example, the jacket may be of quartz or ceramics with metal bonded thereto. The relative thickness of the respective cylinders may also vary depending on the other design parameters. Similarly, it is not necessary for the contiguous surfaces of the respective cylindrical jackets to be fastened together although a tight fit is required at the lowest temperature point of the compensated temperature range. The invention herein is not confined to resonant cavities operating in the $TM_{010}$ mode, but is applicable to any microwave cavity whose resonant frequency is critically dependent on a single interior cavity dimension. In this connection, it will be readily understood that neither jacket 12 nor jacket 14 need have the cylindrical form shown herein and that other configurations are possible, for example it may be spherical if desired.

Having thus described the invention, it will be obvious that numerous modifications and departures, as explained above, may now be made by those skilled in the art, all of which fall within the scope contemplated by the invention. Consequently, the invention herein disclosed is to be construed as limited only by the spirit and scope of the appended claims.

I claim:

1. A microwave cavity comprising a first metallic jacket having a hollow interior dimensioned to constitute the resonant chamber of said cavity, a second metallic jacket surrounding said first jacket and having an interior surface contiguous with the exterior surface of said first jacket, each of said jackets being made of different materials having coefficients of thermal expansion and moduli of elasticity chosen to maintain at least one interior dimension of said first jacket constant with changes of temperature.

2. A microwave cavity comprising a first metallic jacket having a hollow interior dimensioned to constitute a cylindrical resonant cavity chamber, a second metallic jacket surrounding said first jacket and having an interior surface contiguous with the exterior surface of said first jacket, said jackets being made of different metals having coefficients of thermal expansion and moduli of elasticity chosen to maintain the inside diameter of said cavity constant with changes of temperature.

3. A cylindrical microwave cavity comprising a first cylindrical jacket having a hollow interior dimensioned to constitute the cylindrical resonant chamber of said cavity, a second cylindrical jacket surrounding said first jacket and having an interior surface contiguous throughout with the exterior surface of said first jacket, said jackets being made of different materials having coefficients of thermal expansion and moduli of elasticity chosen to maintain the inside diameter of said cavity constant with changes of temperature.

4. A cylindrical microwave cavity comprising a first cylindrical jacket having a hollow interior dimensioned to constitute the resonant chamber of said cavity, a second cylindrical jacket surrounding said first jacket and having an interior surface contiguous throughout with the exterior surface of said first jacket, said contiguous surfaces being joined together to prevent relative motion therebetween, said jackets being made of different metals having thermal expansion coefficients and moduli of elasticity chosen to maintain the inside diameter of said cavity constant with changes of temperature.

5. A microwave cavity comprising a hollow, metallic right cylinder of uniform thickness having a predetermined thermal coefficient of expansion and modulus of elasticity, means disposed in surrounding contact with the exterior surface of said cylinder, said means being adapted to compensate for volumetric changes of said cylinder with changes of temperature to maintain the inside diameter of said cavity constant.

6. A microwave cavity comprising a metallic jacket having a predetermined thermal coefficient of expansion, said jacket having a hollow interior dimensioned to constitute the resonant chamber of said cavity, means disposed in surrounding contact exteriorly of said jacket, said means being adapted to compensate for volumetric changes of said jacket with changes of temperature to maintain at least one interior dimension of said cavity constant.

7. A microwave cavity comprising a metallic jacket having a predetermined thermal coefficient of expansion, said jacket having a hollow interior dimensioned to constitute the resonant chamber of said cavity, means disposed exteriorly of said jacket and joined thereto, said means being adapted to compensate for volumetric changes of said jacket with changes of temperature to maintain at least one interior dimension of said cavity constant.

8. A microwave cavity comprising a metallic jacket having a hollow interior dimensioned to constitute the resonant chamber of said cavity, said jacket having a thermal coefficient of expansion tending to bring about an increase of corresponding interior and exterior jacket dimensions with increasing temperature, and means surrounding said jacket adapted to place an elastic constraint on the increase of said exterior jacket dimension to maintain said interior jacket dimension constant with increasing temperature.

9. The apparatus of claim 8 wherein the thermal coefficient of expansion of said elastic constraining means is greater than zero but smaller than the corresponding quantity of said jacket.

10. A microwave cavity comprising a metallic jacket having a hollow interior dimensioned to constitute the resonant chamber of said cavity, the thermal coefficient of expansion of said jacket tending to bring about an increase of corresponding interior and exterior jacket dimensions with increasing temperature, and means surrounding said jacket adapted to constrain the increase of said exterior jacket dimension, said means having a thermal coefficient of expansion greater than zero but sufficiently smaller than the corresponding quantity of said jacket to maintain said interior jacket dimension constant with increasing temperature.

11. A cylindrical microwave cavity adapted to operate in the $TM_{010}$ mode, comprising a first right cylinder of uniform wall thickness having a hollow interior dimensioned to constitute the resonant chamber of said cavity, a second right cylinder of uniform wall thickness coaxially surrounding said first cylinder, said second cylinder having a predetermined modulus of elasticity, the exterior surface of said first cylinder being contiguous throughout with the interior surface of said second cylinder and being joined thereto, said first cylinder having a predetermined thermal coefficient of expansion causing respective exterior and interior diameters thereof to increase with increasing temperature, said second cylinder elastically opposing the increase of the exterior diameter of said first cylinder to maintain the interior diameter of said first cylinder constant with changing temperature.

12. The apparatus of claim 11 wherein the thermal coefficient of expansion of said second cylinder is greater than zero but smaller than the corresponding quantity of said first cylinder.

13. A cylindrical microwave cavity adapted to operate in the $TM_{010}$ mode, comprising a first right cylinder of uniform wall thickness having a hollow interior dimensioned to constitute the resonant chamber of said cavity, a second right cylinder of uniform wall thickness coaxially surrounding said first cylinder, said second cylinder having a predetermined modulus of elasticity, the exterior surface of said first cylinder being contiguous throughout with the interior surface of said second cylinder and being affixed thereto, said first cylinder having a predetermined thermal coefficient of expansion causing respective exterior and interior diameters thereof to increase with increasing temperature, said second cylinder having a thermal coefficient of expansion greater than zero but smaller than the corresponding quantity of said first cylinder, said second cylinder opposing the increase of the exterior diameter of said first cylinder to maintain the interior diameter of the first cylinder constant with increasing temperature.

References Cited in the file of this patent

UNITED STATES PATENTS 2,386,747    Ris  ---------- Oct. 16, 1945

FOREIGN PATENTS 566,079    Canada  ---------- Feb. 16, 1957